(12) United States Patent
Morikazu

(10) Patent No.: US 10,923,873 B2
(45) Date of Patent: Feb. 16, 2021

(54) LASER PROCESSING APPARATUS

(71) Applicant: DISCO CORPORATION, Tokyo (JP)

(72) Inventor: Hiroshi Morikazu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 350 days.

(21) Appl. No.: 16/026,267

(22) Filed: Jul. 3, 2018

(65) Prior Publication Data

US 2019/0013636 A1 Jan. 10, 2019

(30) Foreign Application Priority Data

Jul. 7, 2017 (JP) ................. 2017-133344

(51) Int. Cl.
*B23K 26/00* (2014.01)
*H01S 3/00* (2006.01)
(Continued)

(52) U.S. Cl.
CPC .......... *H01S 3/0057* (2013.01); *B23K 26/032* (2013.01); *B23K 26/064* (2015.10); *B23K 26/067* (2013.01); *B23K 26/0622* (2015.10); *B23K 26/0624* (2015.10); *B23K 26/0652* (2013.01); *B23K 26/0732* (2013.01); *B23K 26/0738* (2013.01); *B23K 26/0853* (2013.01);
(Continued)

(58) Field of Classification Search
CPC .... B23K 26/02; B23K 26/032; B23K 26/042; B23K 26/0604; B23K 26/0608; B23K 26/0613; B23K 26/0622; B23K 26/0624; B23K 26/0626; B23K 26/064; B23K 26/0648; B23K 26/0652; B23K 26/067; B23K 26/0673; B23K 26/0676; B23K 26/073; B23K 26/0732; B23K 26/0738; B23K 26/082; B23K 26/0853; B23K 26/0869; B23K 26/0876; B23K 26/359; B23K 26/364; G02F 1/353; G02F 1/3551; G02F 2001/354; G02B 27/283; G02B 27/286; H01S 3/005; H01S 3/0057; H01S 3/0071; H01S 3/0092
USPC ............. 219/121.6, 121.61, 121.65, 121.66, 219/121.67, 121.68, 121.69, 219/121.73–121.75, 121.78, 121.79
See application file for complete search history.

(56) References Cited

U.S. PATENT DOCUMENTS

| | | | | |
|---|---|---|---|---|
| 2010/0317172 A1* | 12/2010 | Morikazu | .......... | B23K 26/0608 219/121.68 |
| 2012/0061356 A1* | 3/2012 | Fukumitsu | .......... | B28D 5/0005 219/121.61 |
| 2013/0240494 A1* | 9/2013 | Nomaru | ............ | B23K 26/0869 219/121.67 |

FOREIGN PATENT DOCUMENTS

JP 10305410 A 11/1998
JP 2004188475 A 7/2004

* cited by examiner

*Primary Examiner* — Hung D Nguyen
(74) *Attorney, Agent, or Firm* — Greer Burns & Crain Ltd.

(57) ABSTRACT

A laser processing apparatus includes: a chuck table that holds a workpiece; a laser beam applying unit that applies a pulsed laser beam having a predetermined line width to the workpiece held by the chuck table; and a processing feeding unit that performs relative processing feeding of the chuck table and the laser beam applying unit. The laser beam applying unit includes: a laser oscillator that oscillates the pulsed laser beam; a focusing device that focuses the pulsed laser beam oscillated by the laser oscillator; and a pulse width adjustment unit that is disposed between the laser oscillator and the focusing device and that generates a time difference in a wavelength region of the pulsed laser beam (Continued)

in the predetermined line width, thereby adjusting the pulse width.

6 Claims, 3 Drawing Sheets

(51) Int. Cl.
*G02B 27/28* (2006.01)
*G02F 1/35* (2006.01)
*G02F 1/355* (2006.01)
*B23K 26/0622* (2014.01)
*B23K 26/067* (2006.01)
*B23K 26/073* (2006.01)
*B23K 26/06* (2014.01)
*B23K 26/08* (2014.01)
*B23K 26/064* (2014.01)
*B23K 26/03* (2006.01)
*B23K 26/14* (2014.01)

(52) U.S. Cl.
CPC ......... *G02B 27/283* (2013.01); *G02B 27/286* (2013.01); *G02F 1/353* (2013.01); *G02F 1/3551* (2013.01); *G02F 2001/354* (2013.01); *H01S 3/0071* (2013.01); *H01S 3/0092* (2013.01)

LASER PROCESSING APPARATUS

BACKGROUND OF THE INVENTION

Field of the Invention

The present invention relates to a laser processing apparatus provided with a pulse width adjustment unit capable of adjusting the pulse width of a laser beam applied to a workpiece.

Description of the Related Art

A wafer in which a plurality of devices such as integrated circuits (ICs), large scale integrated circuits (LSIs), surface-acoustic-wave devices (SAWs), bulk acoustic wave devices (BAWs), light emitting diodes (LEDs), laser diodes (LDs), and power devices are formed on an upper surface of a substrate of Si, SiC, $SiO_2$, $Al_2O_3$, LT ($LiTaO_3$), LN ($LiNbO_3$) or the like in the state of being partitioned by division lines (streets) is divided into individual device chips by a laser processing apparatus, and the thus divided device chips are utilized for electric apparatuses such as mobile phones, personal computers and communication apparatuses.

The laser processing apparatus is configured to include at least a chuck table that holds a workpiece, a laser beam applying unit that applies a pulsed laser beam to the workpiece held by the chuck table, and a processing feeding unit that performs relative processing feeding of the chuck table and the laser beam applying unit (see, for example, Japanese Patent Laid-open No. 1998-305420 and Japanese Patent Laid-open No. 2004-188475).

SUMMARY OF THE INVENTION

As above-mentioned, the kind of the substrate constituting the devices ranges widely over Si, SiC, $SiO_2$, $Al_2O_3$, LT ($LiTaO_3$), LN ($LiNbO_3$) and so on. Therefore, various processing methods should be selected according to the kind of the substrate, the kind of the devices formed thereon, the thickness of the wafer and so on, and, at the same time, a laser processing apparatus for applying a laser beam having a suitable pulse width should be selectively used. If the laser processing apparatuses are prepared according to the varying conditions, huge equipment cost is needed, which is uneconomical.

It is therefore an object of the present invention to provide a laser processing apparatus capable of adjusting the pulse width of a laser beam applied, without increasing the equipment cost.

In accordance with an aspect of the present invention, there is provided a laser processing apparatus including: a chuck table that holds a workpiece; a laser beam applying unit that applies a pulsed laser beam of a wavelength having a predetermined line width to the workpiece held by the chuck table; and a processing feeding unit that performs relative processing feeding of the chuck table and the laser beam applying unit, in which the laser beam applying unit includes a laser oscillator that oscillates the pulsed laser beam, a focusing device that focuses the pulsed laser beam oscillated by the laser oscillator, and a pulse width adjustment unit that is disposed between the laser oscillator and the focusing device and that generates a time difference in a wavelength region of the pulsed laser beam in the line width, thereby adjusting pulse width.

Preferably, the laser beam applying unit further includes a polarization beam splitter that splits the pulsed laser beam oscillated by the laser oscillator, the focusing device focuses the pulsed laser beam reflected by the polarization beam splitter, and the pulse width adjustment unit is disposed on the opposite side of the polarization beam splitter from the laser oscillator and adjusts the pulse width of the pulsed laser beam transmitted through the polarization beam splitter.

Preferably, the laser beam applying unit further includes a half-wave plate that is disposed between the laser oscillator and the polarization beam splitter and that selectively positions P polarized light or S polarized light relative to the polarization beam splitter, and a first quarter-wave plate that is disposed between the polarization beam splitter and the pulse width adjustment unit and that converts the P polarized light selected by the half-wave plate into circularly polarized light, and the pulsed laser beam of the circularly polarized light with a rotation direction reversed by the pulse width adjustment unit is guided to the first quarter-wave plate to be converted into S polarized light, and the pulsed laser beam converted into the S polarized light is reflected by the polarization beam splitter to be incident on the focusing device.

Preferably, the laser beam applying unit further includes a second quarter-wave plate disposed on the opposite side of the polarization beam splitter from the focusing device, and a mirror disposed to face the second quarter-wave plate, and the S polarized light selected by the half-wave plate is reflected by the polarization beam splitter, is incident on the second quarter-wave plate and converted into circularly polarized light, and is further reflected by the mirror to have a rotation direction reversed, the pulsed laser beam of the circularly polarized light with the rotation direction reversed is transmitted through the second quarter-wave plate to be converted into P polarized light, and the pulsed laser beam of the P polarized light is transmitted through the polarization beam splitter to be incident on the focusing device.

Preferably, the pulse width adjustment unit is composed of a quartz body having a first end face and a second end face opposite to the first end face, and a plurality of reflection layers that reflect in the wavelength region of the line width are formed between the first end face and the second end face, and the pulse width of the pulsed laser beam applied to the workpiece is determined by the length between the first end face and the second end face.

Preferably, the pulse width adjustment unit includes a plurality of quartz bodies differing in the length between the first end face and the second end face, and one of the plurality of quartz bodies is selected according to a desired pulse width.

Preferably, the laser beam applying unit further includes a wavelength conversion unit that converts the wavelength of the pulsed laser beam having the pulse width adjusted by the pulse width adjustment unit.

According to the present invention, the laser beam applying unit includes the laser oscillator that oscillates a pulsed laser beam, the focusing device that focuses the pulsed laser beam oscillated by the laser oscillator, and the pulse width adjustment unit that is disposed between the laser oscillator and the focusing device and that generates a time difference in the wavelength region of the pulsed laser beam in the predetermined line width, thereby adjusting the pulse width. By this, the pulsed laser beam can be adjusted to a proper pulse width for the substrate the kind of the material of which ranges widely over Si, SiC, $SiO_2$, $Al_2O_3$, LT, LN and so on. Therefore, it is unnecessary to select a laser processing apparatus for applying a pulsed laser beam with a pulse width according to the kind of the substrate. As a result, the problem of huge equipment cost, which is uneconomical, can be solved.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
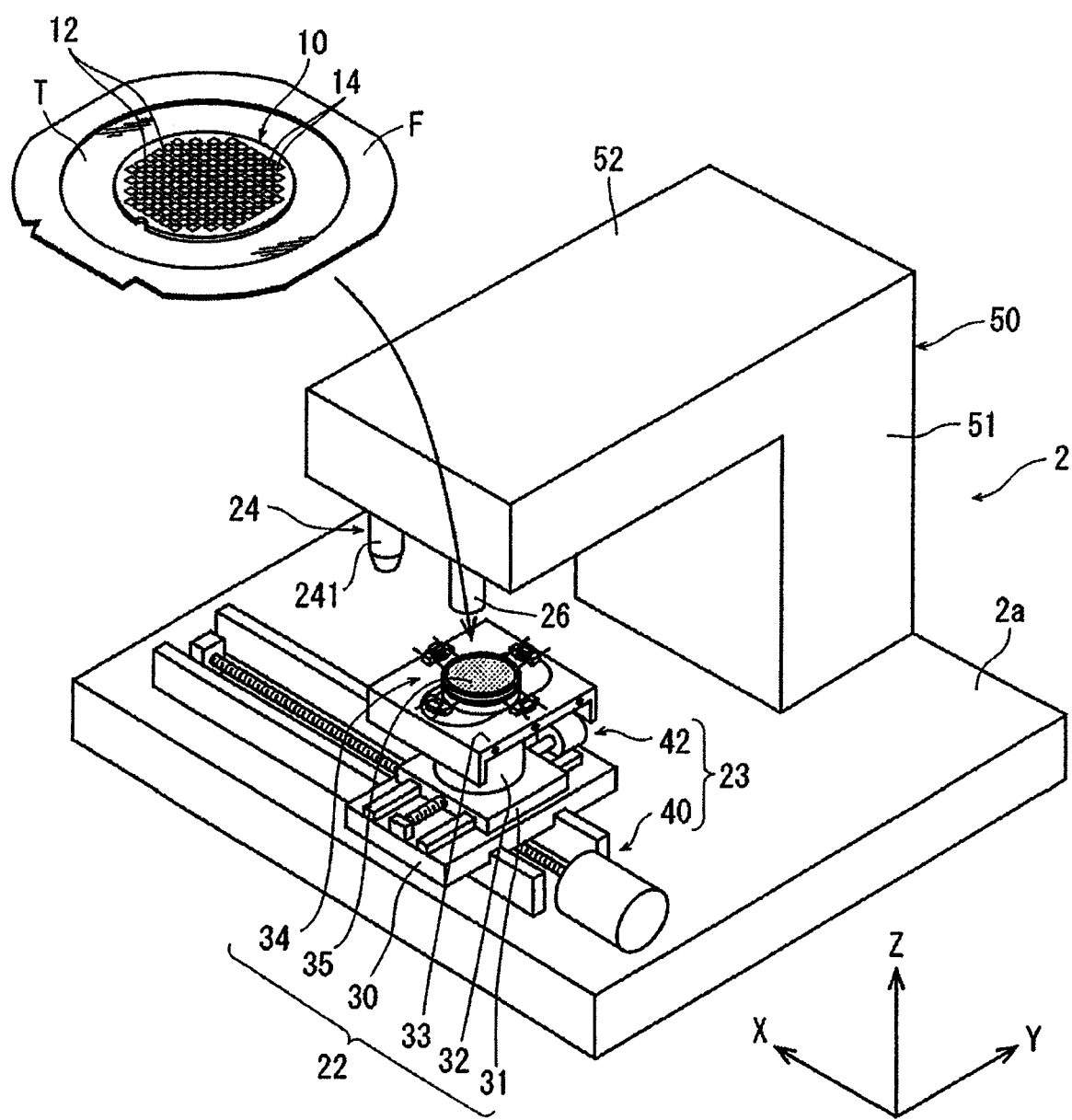
FIG. 1 is a general perspective view of a laser processing apparatus according to an embodiment of the present invention.

A laser processing apparatus according to the present invention will now be described in detail with reference to the attached drawings. FIG. 1 depicts a general perspective view of a laser processing apparatus 2 configured in accordance with the present invention. The laser processing apparatus 2 includes: a holding unit 22 for holding a workpiece; a moving unit 23 that is disposed on a stationary base 2a and that moves the holding unit 22; a laser beam applying unit 24 for applying a laser beam to the workpiece held by the holding unit 22; and a frame body 50 which is composed of a vertical wall section 51 erected on the stationary base 2a on a lateral side of the moving unit 23 in a Z direction indicated by arrow Z, and a horizontal wall section 52 extending in a horizontal direction from an upper end portion of the vertical wall section 51. An optical system of the laser beam applying unit 24 constituting a main section of the laser processing apparatus 2 of the present invention is incorporated in the inside of the horizontal wall section 52 of the frame body 50, a focusing device 241 constituting the laser beam applying unit 24 is disposed on a lower side of a tip portion of the horizontal wall section 52, and an imaging unit 26 is disposed at a position adjacent to the focusing device 241 in regard of a direction indicated by arrow X in the figure. Note that the holding unit 22 holds the workpiece (wafer 10) held by an annular frame F through an adhesive tape T depicted in an enlarged form at a left upper side in the figure. Note that a case in which the wafer 10 is composed of a Si (silicon) substrate and is subjected to ablation processing by applying thereto a pulsed laser beam of a wavelength of 355 nm so as to be absorbed in Si is described in the present embodiment, but this is not limitative of the laser processing apparatus of the present invention.

The holding unit 22 includes: a rectangular X-direction movable plate 30 mounted on the base 2a so as to be movable in the X direction indicated by arrow X in the figure; a rectangular Y-direction movable plate 31 mounted on the X-direction movable plate 30 so as to be movable in a Y direction indicated by arrow Y in the figure; a cylindrical support column 32 fixed to an upper surface of the Y-direction movable plate 31; and a rectangular cover plate 33 fixed to an upper end of the support column 32. On the cover plate 33 is disposed a chuck table 34 which extends upward through a slot formed on the cover plate 33, the chuck table 34 being configured to hold the circular workpiece and be rotatable by a rotational driving unit (not depicted). At an upper surface of the chuck table 34 is disposed a circular suction chuck 35 which is formed from a porous material and extends substantially horizontally. The suction chuck 35 is connected to a suction unit (not depicted) through a passage formed in the support column 32. Note that the X direction is the direction indicated by arrow X in FIG. 1, whereas the Y direction is the direction indicated by arrow Y and orthogonal to the X direction. A plane defined by the X direction and the Y direction is substantially horizontal.

The moving unit 23 includes an X-direction moving unit 40 and a Y-direction moving unit 42. The X-direction moving unit 40 converts a rotational motion of a motor into a rectilinear motion through a ball screw, and transmits the rectilinear motion to the X-direction movable plate 30, to cause the X-direction movable plate 30 to be advanced or retracted in the X direction along guide rails on the base 2a. The Y-direction moving unit 42 converts a rotational motion of a motor into a rectilinear motion through a ball screw, and transmits the rectilinear motion to the Y-direction movable plate 31, to cause the Y-direction movable plate 31 to be advanced or retracted in the Y direction along guide rails on the X-direction movable plate 30. Note that while not depicted in the figure, respective position detection units are disposed in the X-direction moving unit 40 and the Y-direction moving unit 42, whereby the position in the X direction, the position in the Y-direction and a rotational position in the circumferential direction in regard of the chuck table 34 are accurately detected, and the X-direction moving unit 40, the Y-direction moving unit 42 and the rotational driving unit (not depicted) are driven based on instruction signals from a control unit which will be described later, whereby the chuck table 34 can be accurately positioned to an arbitrary position and an arbitrary angle.

As depicted at the left upper side of FIG. 1, the wafer 10 is formed with devices 14 in a plurality of regions partitioned by a plurality of division lines (streets) 12, and is held by the chuck table 34 in the state of being supported by the annular frame F through the adhesive tape T. While a pulsed laser beam is being applied to the wafer 10 from the focusing device 241 by operating the laser beam applying unit 24, the X-direction moving unit 40 and the Y-direction moving unit 42 are operated, whereby laser processing is applied to the division lines 12 to form division grooves which serve as division starting points.

Figure 2:
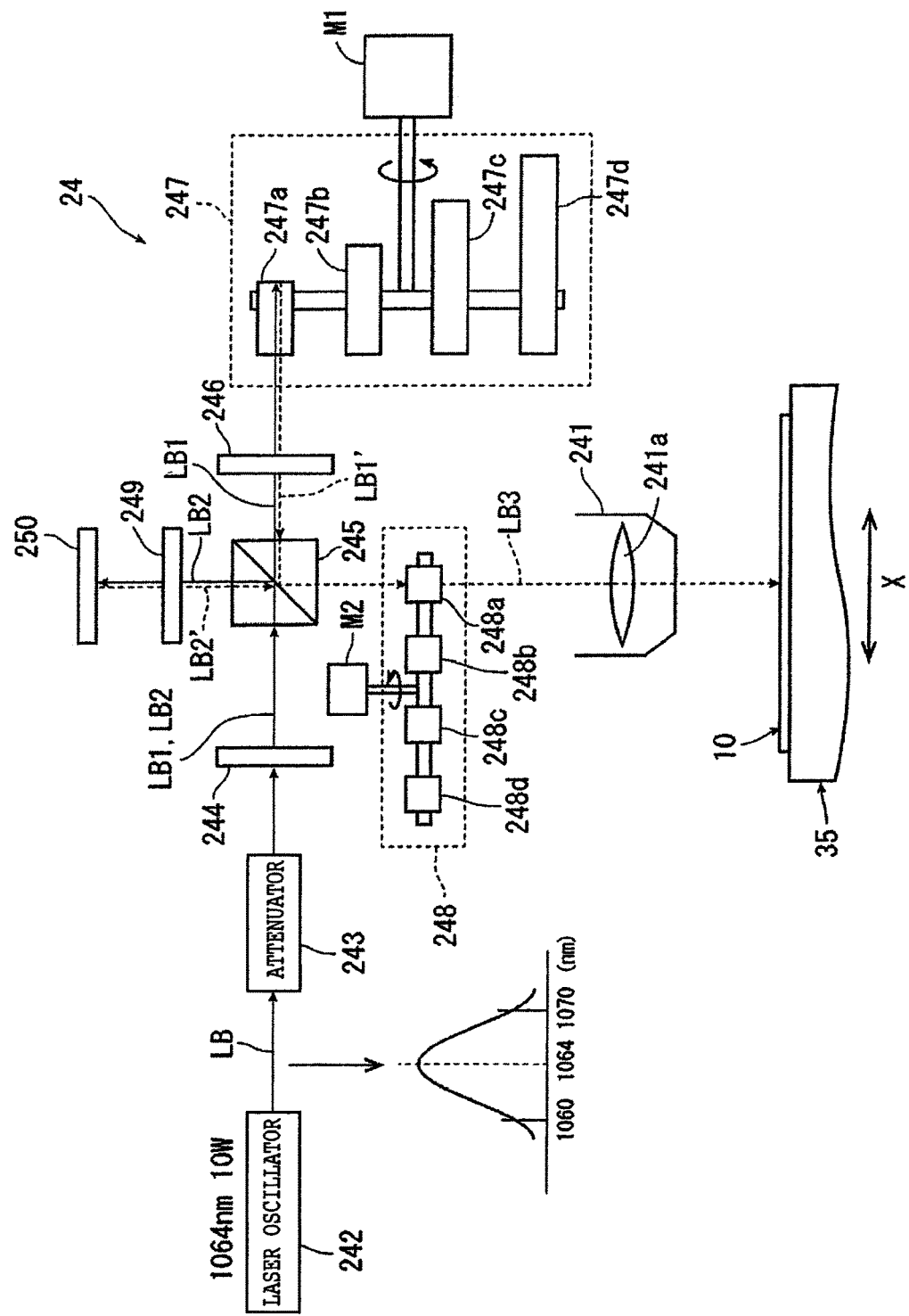
FIG. 2 is a block diagram depicting a laser beam applying unit mounted on the laser processing apparatus depicted in FIG. 1.

The laser beam applying unit 24 configured based on the present invention will be described more specifically with reference to FIG. 2. The laser beam applying unit 24 has a laser oscillator 242 for oscillating a pulsed laser beam LB having an average output of 10 W, a wavelength of 1064 nm and a predetermined line width, and the pulse width of the pulsed laser beam LB oscillated by the laser oscillator 242 is, for example, 100 fs (femtosecond). Here, the line width in the present invention refers to the so-called spectral line width, representing the spreading width of wavelength (in the present embodiment, 1060 to 1070 nm) where the light intensity is lowered to a specific value in relation to that at a wavelength (1064 nm) at which the light intensity is maximized. The pulsed laser beam LB oscillated from the laser oscillator 242 is incident on an attenuator 243 that adjusts the output of the pulsed laser beam LB. The pulsed laser beam LB adjusted to a desired output by the attenuator 243 is incident on a half-wave plate 244. As generally known, the half-wave plate 244 gives a phase difference (optical path difference) of λ/2 (180 degrees) to two polarized light components orthogonal to each other, and selectively emits P polarized light (LB1) or S polarized light (LB2) by rotating a high-speed shaft, and the pulsed laser beams LB1 and LB2 emitted from the half-wave plate 244 are applied to a polarization beam splitter 245. In other words, the half-wave plate 244 is disposed between the laser oscillator 242 and the polarization beam splitter 245.

The pulsed laser beam LB1 in the case where the P polarized light is selected at the half-wave plate 244 is penetrated directly through the polarization beam splitter 245 to be guided to a first quarter-wave plate 246, where it is converted into circularly polarized light having a predetermined rotation direction. The pulsed laser beam LB1 converted into the circularly polarized light by the first quarter-wave plate 246 is guided to a pulse width adjustment unit 247 which will be described in detail later. Return light LB1' having a pulse width converted at the pulse width adjustment unit 247 has the rotation direction reversed by reflection at the pulse width adjustment unit 247, and it is converted into S polarized light when transmitted again through the first quarter-wave plate 246. The return light LB1' thus converted into the S polarized light is reflected this time by the polarization beam splitter 245, whereby its propagating direction is converted into the downward direction in the figure, whereby it is guided to a wavelength conversion unit 248 which will be described in detail later, to be a pulsed laser beam LB3 converted to have a predetermined wavelength, after which it is focused by a focusing lens 241a of the focusing device 241, and is applied to the wafer 10 held on the suction chuck 35.

On the other hand, the pulsed laser beam LB2 in the case where S polarized light is selected by rotating the high-speed shaft of the half-wave plate 244 is reflected by the polarization beam splitter 245. The pulsed laser beam LB2 reflected at the polarization beam splitter 245 has its propagating direction converted into the upward direction in the figure, and it is guided to a second quarter-wave plate 249 disposed on the opposite side of the polarization beam splitter 245 from the focusing device 241. Then, it is converted into circularly polarized light having a predetermined rotation direction by the second quarter-wave plate 249, and is reflected on a mirror 250, to be return light LB2'.

The return light LB2' reflected on the mirror 250 has a rotation direction of circularly polarized light which has been reversed, it is converted into P polarized light by passing again through the second quarter-wave plate 249, and is guided to the polarization beam splitter 245. The return light LB2' of the P polarized light guided to the polarization beam splitter 245 propagates by being transmitted through the polarization beam splitter 245, then, like the above-mentioned return light LB1', it is guided to the wavelength conversion unit 248, to be the pulsed laser beam LB3 converted to have a predetermined wavelength, after which it is focused by the focusing lens 241a of the focusing device 241, and is applied to the wafer 10 held on the suction chuck 35. Note that in the case where S polarized light is selected at the half-wave plate 244, pulse width is not adjusted.

Figure 3:
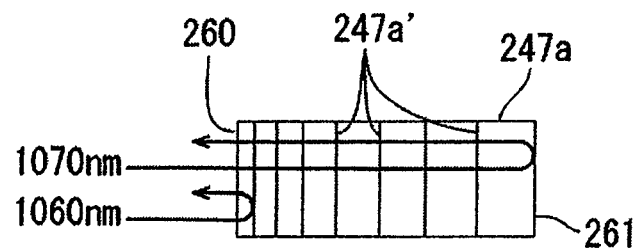
FIG. 3 is a conceptual diagram for explaining the function of a diffraction optical element constituting a pulse width adjustment unit provided in the laser beam applying unit depicted in FIG. 2.

The above-mentioned pulse width adjustment unit 247 will be described more specifically. The pulse width adjustment unit 247 in the present embodiment is composed of diffraction optical elements 247a to 247d called volume Bragg grating. As is understood from the diffraction optical element 247a depicted in FIG. 3 as an example of the diffraction optical elements 247a to 247d, the diffraction optical element is configured as a so-called chirped Bragg grating composed of a quartz body having a refractive index of 1.5 and having a first end face 260 on which the laser beam is incident, and a second end face 261 opposite to the first end face 260, in which a plurality of reflection layers 247a' for reflecting in a wavelength region of the line width (in the present embodiment, 1060 to 1070 nm) of the laser beam applied are formed between the first end face 260 and the second end face 261. The plurality of reflection layers 247a' constituting the diffraction optical element 247a are configured such that the wavelength of beams reflected thereby gradually increases from the first end face 260 side, and the reflection layer 247a' disposed most on the second end face side 261 side is set to reflect a beam of a wavelength of 1070 nm.

Specifically, of the laser beams simultaneously incident on the diffraction optical element 247a, the beam of the wavelength of 1060 nm and the beam of the wavelength of 1070 nm are emitted from the diffraction optical element 247a with a time difference therebetween according to the distance between the first end face and the second end face. The diffraction optical elements 247a to 247d are set so as to have different values of length between the first end face and the second end face, for example, 1 mm, 5 mm, 10 mm, and 30 mm. Note that the diffraction optical element 247a depicted in FIG. 3 and the diffraction optical elements 247b to 247d are different only in the length between the first end face and the second end face, and they are the same as the diffraction optical element 247a in that the plurality of reflection layers for reflecting in the wavelength region of the line width (in the present embodiment, 1060 to 1070 nm) of the laser beam are formed therein. The diffraction optical elements 247a to 247d are disposed on the same circumference of circle, and a step motor M1 is connected to a rotary shaft (omitted in illustration) disposed in the center of the circle. With the step motor M1 rotated based on an instruction signal from the control unit (not depicted), the diffraction optical element to be positioned in the position where the pulsed laser beam LB1 is applied can be changed over as required. Note that the lengths between the first end face and the second end face as depicted in FIG. 2 are exaggerated for convenience of explanation, and are not conforming to the actual lengths.

The above-mentioned wavelength conversion unit 248 will be described more specifically. The wavelength conversion unit 248 is composed of a plurality of wavelength conversion crystals 248a to 248d, and a through-hole that does not convert wavelength. The wavelength conversion crystals 248a to 248d and the through-hole are disposed on the same circumference of circle, like in the case of the aforementioned pulse width adjustment unit 247, and are rotated by a step motor M2 for driving a rotary shaft disposed in the center of the circle based on an instruction signal from the control unit (not depicted). By this, the wavelength conversion crystal or the through-hole to be positioned in the position where the pulsed laser beam LB1 is applied can be changed over as required. The wavelength conversion crystals 248a to 248d are composed, for example, of cesium lithium borate (CLBO) crystal, lithium triborate (LBO) crystal, potassium titanyl phosphate (KTP) crystal, or a combination thereof.

For example, the wavelength conversion crystal 248a for wavelength conversion from a laser beam of a wavelength of 1064 nm to a laser beam of a wavelength of 355 nm is composed of a first LBO crystal and a second LBO crystal; the beam of a wavelength of 1064 nm is converted into the beam of a wavelength of 532 nm by the first LBO crystal, and, further, the beam of a wavelength of 532 nm is converted into the beam of a wavelength of 355 nm by the second LBO crystal. Similarly, the wavelength conversion crystal 248*b* for converting a laser beam of a wavelength of 1064 nm into a laser beam of a wavelength of 266 nm is composed of a KTP crystal and a CLBO crystal. The other wavelength conversion crystals 248*c* and 248*d* are appropriately set according to the wavelengths which are to be obtained through wavelength conversion. Note that when a laser beam is converted to a desired wavelength for use in laser processing by the wavelength conversion crystals 248*a* to 248*d*, laser beams of other wavelengths not used for laser processing are generated in predetermined directions different from the application direction of the laser beam of the desired wavelength. Therefore, beam dampers for absorbing the laser beams of the other wavelengths are disposed at positions in the predetermined directions (omitted in illustration).

The laser processing apparatus 2 according to the present embodiment is generally configured as above, and its operation will be described below.

First, a holding step of holding the wafer 10 on the chuck table 34 is conducted. More specifically, the wafer 10 is placed on the chuck table 34 of the laser processing apparatus 2 depicted in FIG. 1, with the adhesive tape T side on the lower side, the suction unit (not depicted) is operated to suction hold the wafer 10 through the suction chuck 35, and the annular frame F is fixed by clamping with clamps or the like, with the wafer 10 exposed to the upper side.

After the above-mentioned holding step is performed, setting of the pulse width adjustment unit 247 and the wavelength conversion unit 248 is conducted. In the present embodiment, a pulsed laser beam is applied along the division lines 12 of the wafer 10 composed of a Si substrate, to perform ablation processing, thereby forming division grooves which serve as division starting points. Therefore, a laser beam having a wavelength (355 nm) so as to be absorbed in the wafer 10 and a pulse width of approximately 10 ps (picosecond) is formed. For causing the pulse width of the laser beam to be applied to the wafer 10 to be 10 ps, the diffraction optical element 247*a* is positioned to the application position of the pulsed laser beam LB1 by the pulse width adjustment unit 247. In addition, for converting the pulsed laser beam LB of a wavelength of 1064 nm oscillated from the laser oscillator 242 into a laser beam of a wavelength of 355 nm, the wavelength conversion crystal 248*a* of the wavelength conversion unit 248 is positioned to the application position of the laser beam.

After the pulse width adjustment unit 247 and the wavelength conversion unit 248 are set as aforementioned, alignment of aligning a processing region (division line 12) of the wafer 10 and the application position of the focusing device 241 of the laser beam applying unit 24 is conducted using the imaging unit 26 that images the processing region of the wafer 10.

After the alignment is performed, the chuck table 34 is moved to position the application position of the laser beam applied from the focusing device 241 to one end of the division line 12. Then, oscillation of the pulsed laser beam LB from the laser oscillator 242 is started.

As aforementioned, the pulsed laser beam LB oscillated from the laser oscillator 242 is a beam having a wavelength of 1064 nm, an average output of 10 W and a pulse width of 100 fs together with a predetermined line width (1060 to 1070 nm). The pulsed laser beam LB is adjusted to a desired output (for example, 3 W) by the attenuator 243, and is guided to the half-wave plate 244. In the present embodiment, since wavelength conversion by the wavelength conversion unit 247 to be described later is performed, the pulsed laser beam LB guided to the half-wave plate 244 is subjected to selection of P polarized light (laser beam LB1) by the half-wave plate 244, and the laser beam LB1 is emitted from the half-wave plate 244 to be guided to the polarization beam splitter 245. Since the polarization beam splitter 245 transmits the P polarized light as it is, the pulsed laser beam LB1 propagates as it is, and is guided to the quarter-wave plate 246, where it is converted into circularly polarized light having a predetermined rotation direction. The pulsed laser beam LB1 converted into the circularly polarized light is incident on a preset diffraction optical element 247*a* at the pulse width adjustment unit 247. As has been described referring to FIG. 3, the diffraction optical element 247*a* has a configuration in which the length between the first end face and the second end face is set to 1 mm, and the plurality of reflection layers 247*a*' set to have different values of reflection wavelength according to the position in the propagation direction are formed therein.

Figure 4A:
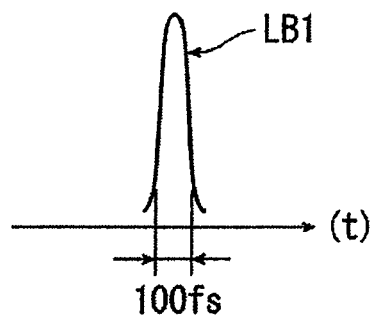
FIGS. 4A to 4C are conceptual diagrams for explaining the manner in which pulse width is extended by the diffraction optical element depicted in FIG. 3.

The manner in which the pulse width of the pulsed laser beam LB1 incident on the diffraction optical element 247*a* is adjusted will be described with reference to FIG. 3 and FIGS. 4A to 4C. FIG. 4A depicts one pulse of the pulsed laser beam LB1 before adjustment of pulse width. While the pulsed laser beam LB1 has been converted into circularly polarized light, it propagates while retaining the pulse width of 100 fs, the same as that when it has been oscillated from the laser oscillator 242. Here, of the pulsed laser beam LB1 first incident on the diffraction optical element 247*a*, the beam component of a wavelength of 1060 nm is reflected by the reflection layer 247*a*' on the first end face 260 side, or the incidence side, as has been described referring to FIG. 3. Further, of the beam components of wavelengths constituting the pulsed laser beam LB1, the beam components with wavelength increasing from 1060 nm are sequentially reflected by reflection layers 247*a*' approaching the second end face 261 side, and the beam component of a wavelength of 1070 nm is reflected by the reflection layer located most on the second end face 261 side.

Figure 4B:
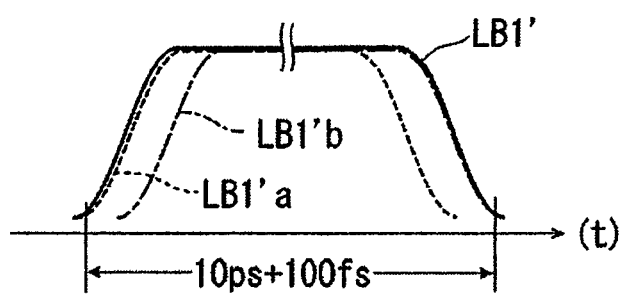

As aforementioned, the diffraction optical element 247*a* has a refractive index of 1.5, and the length between the first end face 260 and the second end face 261 is set to be 1 mm, that is, the reciprocating optical path length difference is set to be 2 mm; for this reason, the beam of a wavelength of 1060 nm reflected first by the reflection layer 247*a*' on the first end face 260 side and the beam of a wavelength of 1070 nm reflected finally by the reflection layer 247*a*' on the second end face 261 side are emitted from the diffraction optical element 247*a*, with a time difference therebetween of approximately 10 ps. As a result, the pulsed laser beam LB1 incident first on the diffraction optical element 247*a* has a pulse width adjusted to approximately 10 ps, as indicated by dotted line LB1'*a* in FIG. 4B. Since the original pulsed laser beam LB1 which is incident has a pulse width of 100 fs, conversion of the pulsed laser beam LB1 into the laser beam having a pulse width of 10 ps is continued for the period of 100 fs, and the beam indicated by alternative long and short dash line LB1'*b* in FIG. 4B is emitted, whereby adjustment of the pulse width of one pulse is completed. By this, the pulsed laser beam LB1 having a pulse width of 100 fs depicted in FIG. 4A is adjusted to be return light having a pulse width of approximately 10 ps+100 fs indicated by solid line LB1' in FIG. 4B, namely, to be return light LB1', which is emitted from the diffraction optical element 247a.

Figure 4C:
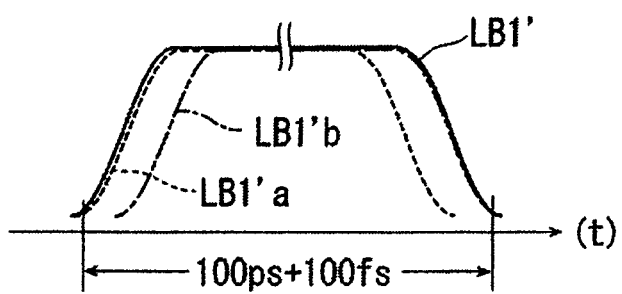

Note that in the case where the diffraction optical element 247b in which the length between the first end face and the second end face is 10 mm is selected at the pulse width adjustment unit 247, the pulsed laser beam LB1 is adjusted to be return light LB1' with a pulse width of 100 ps+100 fs, as depicted in FIG. 4C. Similarly, in the case where the diffraction optical element 247c in which the length between the first end face and the second end face is 5 mm is selected, the pulsed laser beam LB1 is adjusted to be return light LB1' with a pulse width of 50 ps+100 fs, and in the case where the diffraction optical element 247d in which the length between the first end face and the second end face is 30 mm is selected, the pulsed laser beam LB1 is adjusted to be return light LB1' with a pulse width of 300 ps+100 fs.

Here, continuing the description while returning to FIG. 2, the return light LB1' of circularly polarized light formed by reflection at the diffraction optical element 247a undergoes reversion of rotation direction upon reflection at the diffraction optical element 247a, and, therefore, it is made to be S polarized light when converted into linearly polarized light by the quarter-wave plate 246. The return light LB1' thus made to be the S polarized light is reflected at the polarization beam splitter 245, and its propagation direction is converted to the lower side in the figure, namely, toward the wavelength conversion unit 248.

Here, as above-mentioned, in the present embodiment, the wavelength conversion unit 248 is operated based on an instruction signal from the control unit (not depicted), and the wavelength conversion crystal 248a is positioned at the application position of the return light LB1'. The wavelength conversion crystal 248a is composed of the first LBO crystal and the second LBO crystal, the return light LB1' having had a wavelength of 1064 nm is converted to a wavelength of 355 nm by passing through the wavelength conversion crystal 248a, and it is then guided to the focusing lens 241a of the focusing device 241 to be focused, and is applied to the wafer 10 held on the suction chuck 35.

A dividing step is conducted in which while the laser beam of a wavelength (355 nm) so as to be absorbed in the wafer 10 is being focusedly applied to a surface position of the wafer 10 by the focusing device 241 of the laser beam applying unit 24 as aforementioned, the moving unit 23 is operated to move the chuck table 34 in the direction indicated by arrow X at a predetermined processing feed speed. Then, when the other end of the division line 12 has reached the application position of the focusing device 241, the oscillation of the laser oscillator 242 is stopped, and the movement of the chuck table 34 is stopped. As a result, a division groove is favorably formed along a predetermined division line 12 of the wafer 10.

After the division groove is formed over the range from one end to the other end of the predetermined division line 12 by the aforementioned laser processing, the holding unit 22, the moving unit 23 and the rotational driving unit (not depicted) are operated to move the chuck table 34, whereby the position of the wafer 10 relative to the focusing device 241 is changed, and, while doing so, the dividing step is similarly applied to the rest of the division lines 12, to thereby form division grooves along all the division lines 12 of the wafer 10.

In the present invention, since the above-mentioned configuration is provided, specifically, since the pulse width adjustment unit 247 is provided, pulse width can be adjusted to a suitable value, as required, so that division grooves can be favorably formed along the division lines 12 of the wafer 10, without increasing the equipment cost.

Further, in the present invention, the wavelength conversion unit 248 is provided, whereby the pulsed laser beam LB1 oscillated from the laser oscillator 242 and adjusted by the pulse width adjustment unit 247 can be converted into a desired wavelength, as required. Particularly, in the present embodiment, the wavelength conversion unit 248 is provided on the downstream side of the pulse width adjustment unit 247 in regard of the propagation direction of the laser beam. If the wavelength conversion unit 248 is provided on the upstream side of the pulse width adjustment unit 247, it would be necessary for the diffraction optical elements 247a to 247d provided in the pulse width adjustment unit 247 to be prepared for each of the converted wavelengths. In the present embodiment, on the other hand, this problem is obviated by providing the wavelength conversion unit 248 on the downstream side of the pulse width adjustment unit 247.

The laser processing apparatus 2 according to the present embodiment also has a configuration in which a laser beam is applied to the wafer 10 to perform laser processing, without conducting adjustment of the pulse width of the pulsed laser beam LB oscillated from the laser oscillator 242. This will be described in detail below with reference to FIG. 2.

In the case of applying the laser beam to the wafer 10 without changing the pulse width of 100 fs of the laser beam oscillated by the laser oscillator 242, first, the high-speed shaft of the half-wave plate 244 is preliminarily rotated to set the half-wave plate 244 in such a manner that S polarized light will be selected when the pulsed laser beam LB passes therethrough.

The pulsed laser beam LB2 made to be the S polarized light by passing through the half-wave plate 244 is reflected at the polarization beam splitter 245, and its propagation direction is changed toward the upper side in the figure. The pulsed laser beam LB2 changed in the propagation direction is guided to the second quarter-wave plate 249, and, by passing the second quarter-wave plate 249, it is converted into circularly polarized light having a predetermined rotation direction. The pulsed laser beam LB2 converted into the circularly polarized light is then guided to the mirror 250, and is reflected by the mirror 250, whereby its rotation direction is reversed and it is made to be return light LB2'.

The return light LB2' again passes through the second quarter-wave plate 249 as it is the circularly polarized light, but, since its rotation direction has been reversed, it is converted this time into P polarized light, and is guided to the polarization beam splitter 245. When the return light LB2' converted into the P polarized light is guided to the polarization beam splitter 245, the return light LB2' passes through the polarization beam splitter 245 without being reflected, and is guided to the wavelength conversion unit 248. The return light LB2' guided to the wavelength conversion unit 248 is appropriately converted in wavelength, similarly to the return light LB1' passed through the pulse width adjustment unit 247 described above, and is applied to the wafer 10, whereby laser processing can be performed.

The present invention is not limited to the above-mentioned embodiment, and various modifications can be assumed so long as they fall within the technical scope of the invention as described in claims. For instance, the specifications (wavelength, pulse width, average output) of the laser oscillator 242 in the above embodiment, the specifications and number of the diffraction optical elements 247a to 247d constituting the pulse width adjustment unit 247, the specifications and number of the wavelength conversion crystals 248a to 248d constituting the wavelength conversion unit 248, and the like can be appropriately selected and modified according to the kind of the laser oscillator used, the processing method in performing laser processing, the substrate material of the workpiece assumed, and so on.

In the present embodiment, the wafer 10 is placed on the suction chuck 35 with the front surface of the wafer 10 on the upper side, and the laser beam is applied from the front surface side to form the division grooves in the front surface, but this is not limitative of the present invention. The present invention is applicable also to a laser processing apparatus to be used in a processing method in which processing for forming division grooves is conducted from the back surface side of the wafer 10, a processing method in which a laser beam of such a wavelength as to be transmitted through a substrate is applied to the substrate with the focal point of the laser beam positioned in the inside of the substrate to form modified layers, or a processing method in which a laser beam of such a wavelength as to be transmitted through a substrate is applied to the substrate with the focal point of the laser beam positioned in the inside of the substrate to form so-called shield tunnels.

In the above-described embodiment, as a method of applying a laser beam to the wafer 10 without changing the pulse width of the laser beam LB oscillated from the laser oscillator 242, a method has been adopted in which the half-wave plate 244, the second quarter-wave plate 249 and the mirror 250 are applied to apply the laser beam to the wafer 10 on the suction chuck 35, but this is not restrictive of the present invention. For example, a mirror may be separately disposed on the circumference of circle on which the diffraction optical elements 247a to 247d are disposed in the pulse width adjustment unit 247, and the mirror may be positioned at the application position of the pulsed laser beam LB1, whereby an effect equivalent to that of the aforementioned method can be obtained, and the half-wave plate 244, the second quarter-wave plate 249 and the mirror 250 can be thereby discarded.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table that holds a workpiece;
a laser beam applying unit that applies a pulsed laser beam of a wavelength having a predetermined line width to the workpiece held by the chuck table; and
a moving unit that performs relative processing feeding of the chuck table and the laser beam applying unit,
wherein the laser beam applying unit includes
a laser oscillator that oscillates the pulsed laser beam,
a focusing device that focuses the pulsed laser beam oscillated by the laser oscillator,
a pulse width adjustment unit that is disposed between the laser oscillator and the focusing device and that generates a time difference in a wavelength region of the pulsed laser beam in the line width, thereby adjusting pulse width;
a half-wave plate that is disposed between the laser oscillator and a polarization beam splitter that splits the pulsed laser beam oscillated by the laser oscillator, and that selectively positions P polarized light or S polarized light relative to the polarization beam splitter, and
a first quarter-wave that is disposed between the polarization beam splitter and the pulse width adjustment unit and that converts the P polarized light selected by the half-wave plate into circularly polarized light, wherein the pulsed laser beam of the circularly polarized light with a rotation direction reversed by the pulse width adjustment unit is guided to the first quarter-wave plate to be converted into S polarized light, and the pulsed laser beam converted into the S polarized light is reflected by the polarization beam splitter to be incident on the focusing device.

2. The laser processing apparatus according to claim 1, wherein the focusing device focuses the pulsed laser beam reflected by the polarization beam splitter, and
the pulse width adjustment unit is disposed on the opposite side of the polarization beam splitter from the laser oscillator and adjusts the pulse width of the pulsed laser beam transmitted through the polarization beam splitter.

3. The laser processing apparatus according to claim 1, wherein the laser beam applying unit further includes a second quarter-wave plate disposed on the opposite side of the polarization beam splitter from the focusing device, and a mirror disposed to face the second quarter-wave plate, and
the S polarized light selected by the half-wave plate is reflected by the polarization beam splitter, is incident on the second quarter-wave plate and converted into circularly polarized light, and is further reflected by the mirror to have a rotation direction reversed, the pulsed laser beam of the circularly polarized light with the rotation direction reversed is transmitted through the second quarter-wave plate to be converted into P polarized light, and the pulsed laser beam of the P polarized light is transmitted through the polarization beam splitter to be incident on the focusing device.

4. The laser processing apparatus according to claim 1, wherein the pulse width adjustment unit is composed of a quartz body having a first end face and a second end face opposite to the first end face, and
a plurality of reflection layers that reflect in the wavelength region of the line width are formed between the first end face and the second end face, and the pulse width of the pulsed laser beam applied to the workpiece is determined by the length between the first end face and the second end face.

5. The laser processing apparatus according to claim 4, wherein the pulse width adjustment unit includes a plurality of quartz bodies differing in the length between the first end face and the second end face, and one of the plurality of quartz bodies is selected according to a desired pulse width.

6. The laser processing apparatus according to claim 1, wherein the laser beam applying unit further includes a wavelength conversion unit that converts the wavelength of the pulsed laser beam having the pulse width adjusted by the pulse width adjustment unit.

* * * * *